United States Patent
Lipton et al.

(10) Patent No.: US 9,983,384 B2
(45) Date of Patent: May 29, 2018

(54) STEREOSCOPIC LENS FOR DIGITAL CAMERAS

(71) Applicants: Lenny Lipton, Los Angeles, CA (US); John A. Rupkalvis, Burbank, CA (US)

(72) Inventors: Lenny Lipton, Los Angeles, CA (US); John A. Rupkalvis, Burbank, CA (US)

(*) Notice: Subject to any disclaimer, the term of this patent is extended or adjusted under 35 U.S.C. 154(b) by 0 days. days.

(21) Appl. No.: 14/689,818

(22) Filed: Apr. 17, 2015

(65) Prior Publication Data

US 2015/0301313 A1  Oct. 22, 2015

Related U.S. Application Data

(60) Provisional application No. 61/981,833, filed on Apr. 20, 2014.

(51) Int. Cl.
| G02B 13/00 | (2006.01) |
| H04N 13/00 | (2018.01) |
| H04N 5/225 | (2006.01) |
| G03B 17/56 | (2006.01) |
| G03B 35/10 | (2006.01) |

(52) U.S. Cl.
CPC ....... G02B 13/0015 (2013.01); G03B 17/565 (2013.01); G03B 35/10 (2013.01); H04N 5/2254 (2013.01); H04N 13/0048 (2013.01); H04N 13/0066 (2013.01)

(58) Field of Classification Search
CPC .. G02B 13/0015; G03B 35/00; G03B 17/565; G03B 35/10; H04N 13/0048; H04N 13/0066; H04N 13/02; H04N 5/2254
See application file for complete search history.

(56) References Cited

U.S. PATENT DOCUMENTS

| 2,329,294 A | 9/1943 | Ramsdell |
| 2,437,061 A | 3/1948 | Wright |
| 2,729,138 A | 1/1956 | Bernier |
| 2,778,288 A | 1/1957 | Steffen |
| 3,339,998 A | 9/1967 | Hoch |
| 3,363,966 A | 1/1968 | Hoch |
| 3,531,191 A | 1/1970 | Bernier |
| 3,551,036 A * | 12/1970 | Bielusici ............... G03B 35/10 352/60 |
| 3,825,328 A | 7/1974 | Hoch |
| 4,235,503 A | 11/1980 | Condon |
| 4,240,731 A | 12/1980 | Staffieri |
| 4,464,028 A | 8/1984 | Condon |
| 4,509,832 A * | 4/1985 | Jacobsen ............... G02B 7/12 359/669 |
| 4,568,970 A | 2/1986 | Rockstead |

(Continued)

OTHER PUBLICATIONS

Lipton, "Foundation of the Stereoscopic Cinema", 1982, pp. 168-169.

*Primary Examiner* — Christopher S Kelley
*Assistant Examiner* — Maria Vazquez Colon
(74) *Attorney, Agent, or Firm* — Smyrski Law Group, A P.C.

(57) ABSTRACT

An apparatus is disclosed, the apparatus including a lens body configured to fit within a standard cinematic movie camera, the lens body including a plurality of optical elements including a plurality of lenses and a sensor. The plurality of optical elements is arranged to receive two channels of visual images and provide the two channels of images to the sensor.

18 Claims, 8 Drawing Sheets

(56) References Cited

U.S. PATENT DOCUMENTS

| | | |
|---|---|---|
| 5,193,000 A | 3/1993 | Lipton et al. |
| 5,486,948 A * | 1/1996 | Imai ................... G03B 35/08 |
| | | 348/42 |
| 5,874,987 A | 2/1999 | Itoh |
| 7,002,618 B2 | 2/2006 | Lipton et al. |
| 2001/0004298 A1* | 6/2001 | Kobayashi ............. G03B 35/00 |
| | | 359/462 |
| 2002/0009299 A1 | 1/2002 | Lipton |
| 2005/0157260 A1 | 7/2005 | Graham et al. |
| 2008/0151041 A1 | 6/2008 | Shafer et al. |
| 2011/0242287 A1* | 10/2011 | Cieslinski .......... G02B 27/2264 |
| | | 348/49 |
| 2013/0120646 A1* | 5/2013 | Mukai .................. G02B 15/12 |
| | | 348/360 |
| 2013/0155198 A1* | 6/2013 | Nagano ............. H04N 13/0239 |
| | | 348/47 |

* cited by examiner

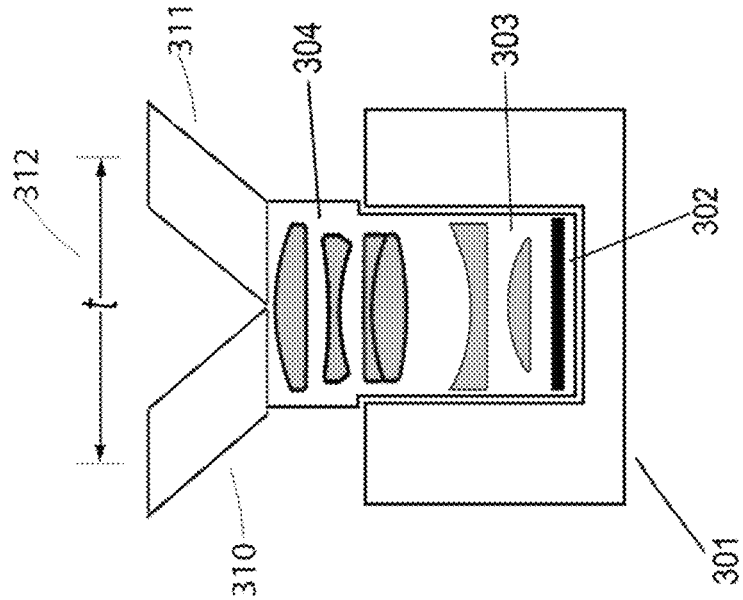
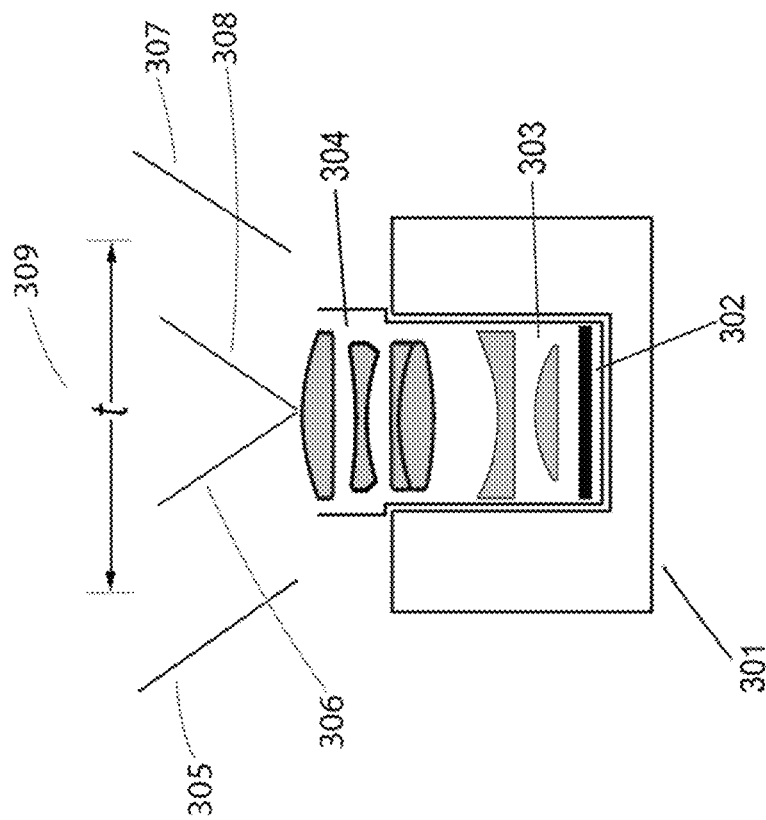
FIG. 3A
FIG. 3B

STEREOSCOPIC LENS FOR DIGITAL CAMERAS

This application claims the benefit of U.S. Provisional Patent Application Ser. No. 61/981,833, filed Apr. 20, 2014, entitled "Stereoscopic Lens for Digital Cameras," the entirety of which is incorporated herein by reference.

BACKGROUND OF THE INVENTION

Field of the Invention

The present invention relates generally to the art of stereoscopic lenses for standard digital cinema cameras, and more specifically to digital cinema cameras enabling viewing cinematography in 3D at the time of photography using currently available digital cameras.

Description of the Related Art

The art of three-dimensional cinematography has been held back because of the lack of a convenient means to photograph theatrical stereoscopic motion pictures. There is no stereoscopic lens in general use that is used with a cinema quality digital camera to produce industry standard high quality images.

Two methods are currently used for creating live-action stereoscopic motion pictures: a post-production process involving synthesis or conversion of two-dimensional cinematography, and photography with a stereoscopic beamsplitter camera rig. A perspective diagrammatic representation of this prior art beamsplitter rig is given in FIG. 1.

The rigs use two cameras 101 and 102, shooting at or through a beamsplitter 103 because the size of professional motion picture cameras precludes their being placed in a simple side-by-side configuration with a center-to-center lens axis distance, the interaxial, t, 106, approximating that of the human inter-pupillary separation. The lens axis of camera 101 is indicated by central ray 104 and the lens axis of camera 102 is indicated by central ray 105. In point of fact, a great deal of stereoscopic cinematography must be accomplished with interaxial separations that are less than the interocular separation. Photography in which the interaxial corresponds to the interocular distance when projected on theater-size screens will often produce background parallax values that greatly exceed the interocular distance. This is called divergence because fusion of such image points requires the eyes' lens axes to diverge, rather than converge, and this may be uncomfortable for most people.

Currently, the predominant type of 3D camera is the beamsplitter rig using variations of a design originated by Floyd Ramsdell, as taught in U.S. Pat. No. 2,413,996, filed in 1944. In this design the lens axes of the cameras are essentially at right angles to each other with one lens seeing through a semi-silvered mirror (the beamsplitter) and the other seeing a reflected image. The semi-silvered mirror is at 45° to the cameras' lens axes as illustrated in FIG. 1. By such means it is possible to greatly reduce the effective interaxial separation. Although some of these rigs, in their latest incarnation, more or less eliminate the difficulties associated with the older versions of the product, they remain big and bulky and require additional crewmembers for operation as well as repeated calibration on set.

It is well known that the stereo-pairs produced by these rigs require post-production rectification to properly coordinate the left and right images so that they conform to the principal of binocular symmetries as enunciated in "Foundations of the Stereoscopic Cinema" (1982, Van Nostrand, New York) which categorizes them as geometric, illumination, and temporal symmetries. Stereoscopic images with asymmetries can cause viewer discomfort.

Beamsplitter rigs are especially prone to producing illumination (density and color) asymmetries and geometrical asymmetries. For example, the transmission and reflection characteristics of a semi-silvered mirror can be unequal producing left and right images with different color rendition and/or density.

The advent and development of modern digital cinema cameras has led to a change in the style and working methods for shooting motion pictures. Their relative compactness and greater light sensitivity, coupled with extreme dynamic range and very good image quality, has made photography simpler to accomplish. For example, lighting packages are smaller, using less electricity, hence reducing heat and expense, and lower illumination is also easier on the eyes of actors and crew. In addition, in the past, actors were required to hit their marks with great precision, but now many productions digital cameras allow for greater flexibility in blocking because they may be more readily handheld.

Use of massive stereoscopic beamsplitter rigs downgrades the art of cinematography to the pre-digital era and eliminates the aforementioned benefits. The rigs, because of their bulk and weight, are mostly used for costly so-called tentpole productions whose budgets are in excess of $100 million. Typically, such pictures are spectacles or superhero movies that can absorb the extra budget required for the rental of the rigs and the addition of extra crewmembers to operate the device and the additional time required to operate the rigs.

In any given year 30 or 40 stereoscopic motion pictures are produced about half of which are live-action and the other half of which are computer-generated animated cartoons. Approximately 150 motion pictures are released each year by the Hollywood studios, and the potential exists for the remaining more than 100 pictures, mostly low or medium budget shows, to be shot stereoscopically. Often these films are likely to be concerned with the human condition with low to medium budgets. Productions like these cannot afford the process of conversion or the budget or endure the rigors that are entailed when using rigs. Therefore a different method for producing stereoscopic live-action content is sought.

It would therefore be beneficial to offer a design that reduces issues associated with on previous 3D camera designs.

DESCRIPTION OF THE DRAWINGS

FIG. 3A is a schematic drawing of an embodiment of the subject technology using a mirror system and a single photographic objective;

FIG. 3B is a schematic drawing of an embodiment of the subject technology using a prism system and a single photographic objective;

DETAILED DESCRIPTION OF THE INVENTION

Figure 1:
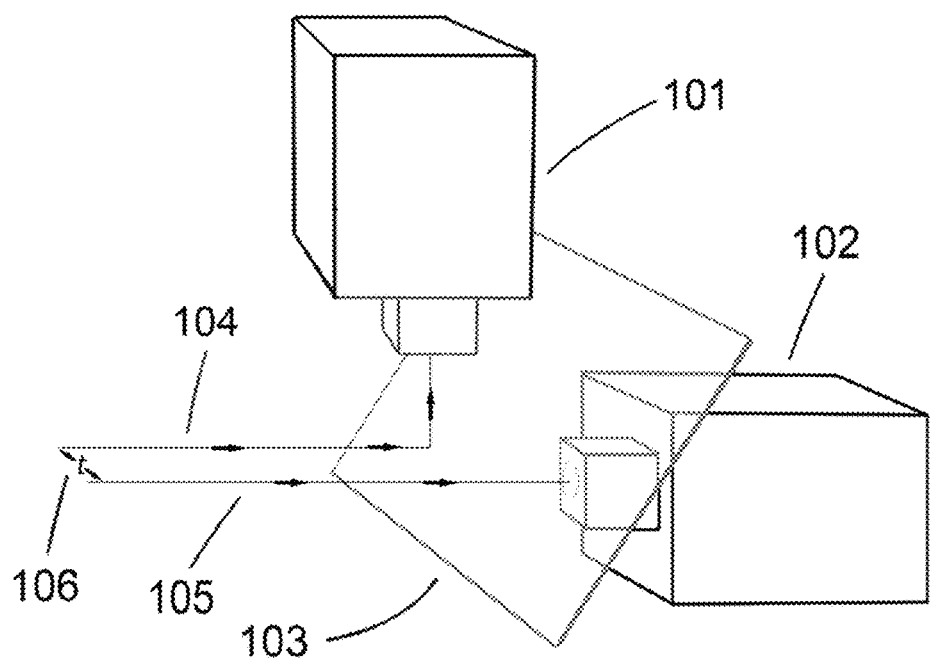
FIG. 1 is a schematic perspective drawing of a prior art beamsplitter rig.

The present design seeks to provide an optical solution alternative to the rigs and to conversion in order by using a single unmodified digital camera for 3D cinematography.

In the past attempts to solve the problem of stereoscopic cinematography using a single camera for theatrical motion picture work has been attempted by a number of inventors such as Condon (U.S. Pat. No. 4,464,028), Hoch (U.S. Pat. No. 3,825,328, and Bielusici (U.S. Pat. No. 3,551,036). These efforts are prior to the advent of the digital cinema and therefore could not take advantages of that technology. The current design takes advantage of changes to filmmaking technology principally in two ways: the lens mount system used for modern digital cinema cameras is more or less the same as that which was used for cinematography using 35 mm film and reflex motion picture cameras, but for modern digital cameras there is no mirror reflex system and therefore the area from the lens mount itself to the image sensor can be more easily used for optical elements.

In addition, digital manipulation of image files makes it possible to correct aberrations and to both rectify and make the left and right images symmetrical, a necessary condition for producing pleasing 3D images as described above with reference to *Foundations of the Stereoscopic Cinema*. Addressing aberrations digitally can allow for simplicity in optical design which can reduce cost, size, and also lead to novel designs that heretofore were impractical. The advantages of both digital geometric rectification and digital correction of binocular asymmetries are significant. Digital corrections of this kind can be made real-time or in post-production whereas prior optical techniques could never achieve a satisfying result. Such digital correction can take place in the camera, between the camera and on-set monitors, and in the post-production pipeline. There is no need to take into account the temporal symmetrical attribute since the images are captured simultaneously.

The subject technology uses side-by-side anamorphically squeezed images and optics to achieve that end, as well as digital correction, to create stereo-pairs on a single digital sensor. The present design uses state-of-the-art stereoscopic image correction software.

The side-by-side technique is well known and has been used for both silver-based film and digital 3D applications. A projection system using the side-by-side squeezed format was employed by Condon for a 35 mm release of the motion picture House of Wax in the 1970s and Lipton et al in a system offered for sale by StereoGraphics Corp. that used the side-by-side anamorphic format in the 1990's for a 3D NTSC television system. Decoding side-by-side squeezed stereo-pairs is presently offered as a feature in tens of millions of television sets with stereoscopic capability using either the field-sequential display approach in conjunction with shuttering electronic eyes, or the interdigitated alternate-line approach with a micropolarizer selection device adhered to the display screen and viewed in conjunction with passive polarizing eyewear.

The subject technology places a stereo-pair (left and right perspective images) on a single digital image sensor, usually similar to the size established for 35 mm film called Super 35. These images are located side-by-side on the sensor and are anamorphically squeezed by a factor of two. For playback or post-production, the images are digitally unsqueezed by a factor of two so that the resultant image retains its normal geometric proportions and aspect ratio. In this way, off-the-shelf digital cinema cameras for shooting theatrical features, instead of complex stereoscopic rigs, may be used to shoot 3D movies.

Further, as will be shown, the subject technology maintains on-set working conditions and methodology and allows for real-time viewing of stereoscopic images as is the current practice, while simultaneously reducing the burden of the crew. Indeed the cinematographer and his or her normal camera crew, without stereoscopic advisors or supplemental help, can accomplish excellent 3D cinematography using the subject technology. Because the optics described here do not involve light losses or polarization artifacts leading to asymmetrical reflections, unlike the rigs which have to shoot through a beamsplitter, lighting packages can be smaller. Since less light is needed for photography the length of the production day is extended. Since the photography is accomplished with a single camera, rather than a cumbersome rig, holding the camera by hand, or with a stabilization device, becomes a simpler task. There is no requirement for frequent recalibration of the lenses and no additional crew members to maintain the hardware are required. The virtue of the subject technology is that it has very few departures from existing on-set techniques for cinematography and likewise for post-production workflow.

Cameras for theatrical motion picture cinematography employing Super 35 sensors are made by Arriflex, Red, Sony, Canon, and others. The most common interchangeable lens mount is probably the PL mount and it and similar mounts afford considerable room for internal optics, approximately 2 inches from the camera flange, or surface where the lens mount engages the camera body, to the digital image sensor. The present design employs a two times (2×) optical anamorphic squeeze to compress the side-by-side images and then a two times (2×) digital unsqueeze element to restore the left and right images to their prior aspect ratio and hence the images to their normal geometric proportions.

The subject optics are used with digital cameras that have single chip digital sensors that are, for the most part, as noted, Super 35 mm size, or 24.9 mm wide by 18.7 mm high, with an aspect ratio of 1.3:1. Most often only a portion of that area is used to create images that have an aspect ratio of 1.85:1 (widescreen) or 2.4:1 (scope) for viewing or exhibition. This is usually accomplished by cropping the top(s) and bottom(s) of the 1.3:1 sensor. In addition, sensors are in use that are close to the 1.85:1 wide screen aspect ratio. The anamorphic technique disclosed here (in conjunction with the side-by-side disposition of the perspective views) will restore the images to their appropriate aspect ratio irrespective of the value of the original aspect ratio.

Figure 2:
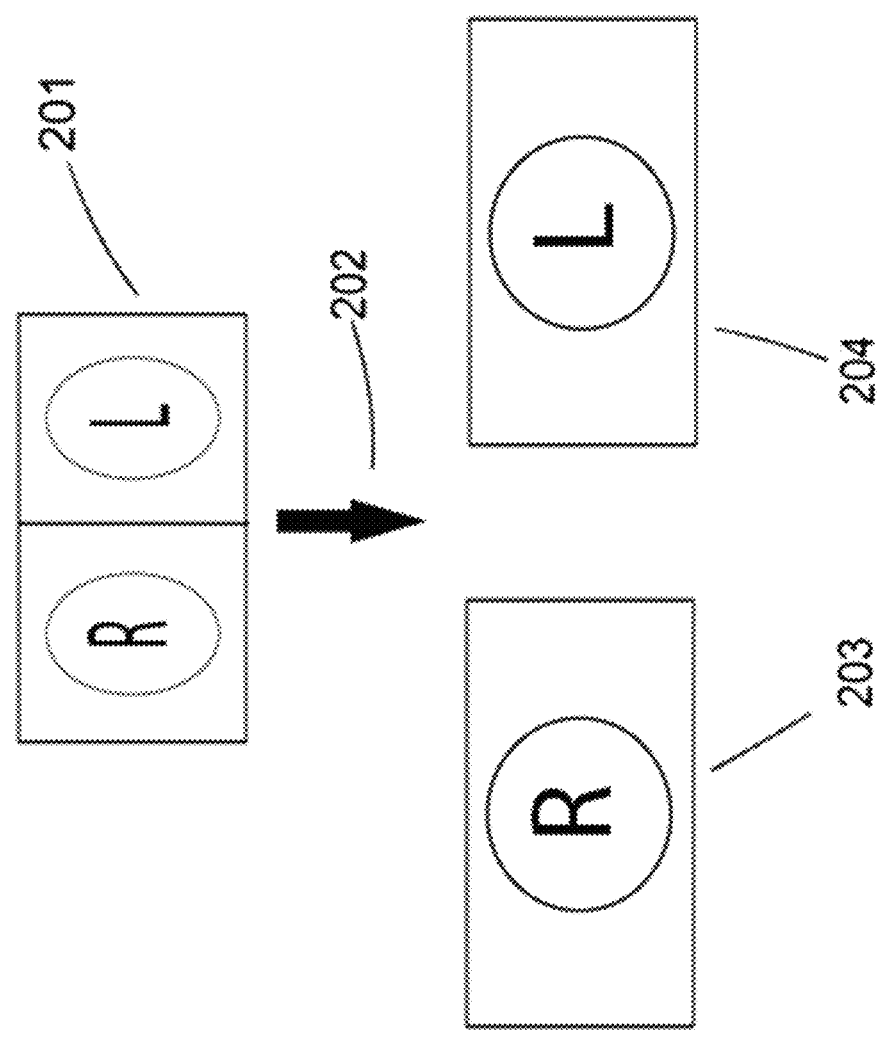
FIG. 2 is a schematic representation of the side-by-side anamorphic format.

In FIG. 2, representation 201 is a graphical representation of the side-by-side format viewed with squeezed images and point 202 represents the process whereby the left and right images can be extracted and decompressed to their normal aspect ratio, as indicated by points 203 and 204. The optics are used with digital cameras that have single chip digital sensors that are, for the most part, Super 35 mm size. That subject anamorphically compressed side-by-side format will also work well with sensors of other dimensions but for the purpose of didactic simplification the assumption is made that the primary use of this technology will be on Super 35 mm size sensors.

A rudimentary embodiment of the technology is disclosed and illustrated with the help of FIGS. 3A and 3B. Digital cinema camera 301, large sensor 302, and anamorphic lens elements 303 are presented. This is a sectional view, assuming a horizontal plane is passing through the center of the device, or a top view. While traditional spherical optics can be adequately illustrated by this means, anamorphic optics 303 cannot be so described because these lens elements are cylindrical and have curvature only in the horizontal direction. Anamorphic elements 303, with a factor of two, used in combination with the spherical elements 304 result in a lens system having a horizontal angle of view two times as wide as that which would have been the case without their use.

For more than 60 years the theatrical motion picture industry, beginning with CinemaScope, has employed anamorphic lenses for cinematography and projection. With refinement anamorphic lenses have vastly improved in quality and are still used for many motion picture productions in this the age of digital cinematography. For this reason the acceptance of this technology by the film industry, for capture of stereoscopic images, is not likely to be question.

Conventional image forming lens 304 is intended to represent a typical design and other lenses or devices may be employed. Reflective surfaces or mirrors 305 and 306 have reflecting surfaces facing each other; similarly mirrors 307 and 308 have reflecting surfaces facing each other. Reflective surfaces are referred to as "mirrors" herein, but any type of reflective surface that provides the requisite functionality would be acceptable and the term "mirror" is intended to mean any reflective surface. The light reflected from these surfaces produces left and right stereo-pairs whose interaxial separation t is given by 309. Without the use of the mirrors, t would have been approximately half the width of the Super 35 sensor or about 12 mms, which is fine for some close work but not adequate for objects at several meters from the lens.

Mirror devices of this kind have been employed without the anamorphic element 303. Attachments for 35 mm still cameras using the Leica format were a well known method for producing stereo-pairs. These simple mirror attachments produce side-by-side images with an undesirable vertical aspect ratio, unlike photography for the cinema which has a horizontal aspect ratio.

With regard to FIG. 3B, most of the parts are the same as above with the exception of the rhombic prism units 310 and 311. These units perform similar function to the mirror unit shown in FIG. 3A. The interaxial separation t is given by 312. Rhombic prisms are the preferred embodiment because of their high index of refraction (compared to air) which reduces the optical path length and hence they are smaller than mirror units. In effect these, and the mirror units, function in a manner similar to periscopes.

Figure 4:
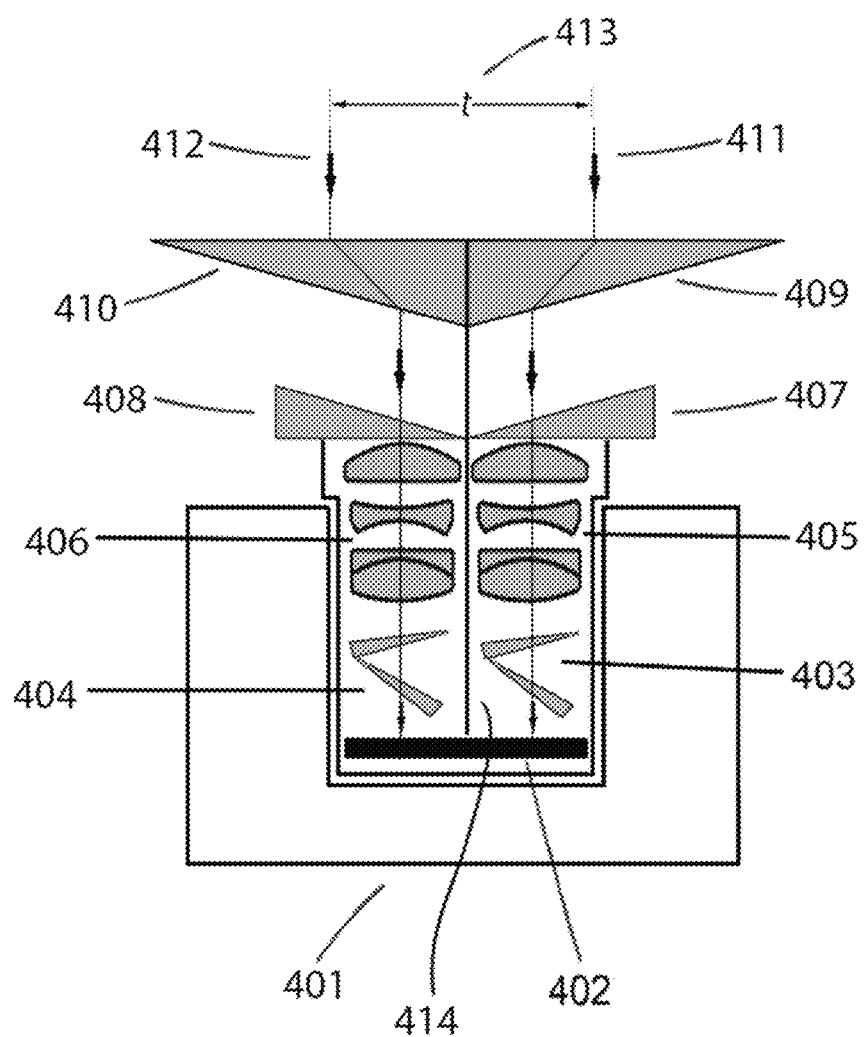
FIG. 4 is a schematic drawing of an embodiment of the subject technology using the prism system and dual photographic objectives and prism anamorphics.

Another embodiment of the invention is shown in FIG. 4. Digital cinema camera 401, sensor 402 of the camera, and photographic objective 405 for one perspective are presented, while an identical photographic objective 406 for the other perspective is also shown. Septum 414 prevents cross talk between the objectives. Parts 408 and 407 are wedge prisms which work optically in concert with wedge prisms 412 and 411, respectively, as shown with the help of ray paths 412 and 411. The effective interaxial separation of lenses 406 and 405 is now distance t indicated by 413. Wedge prisms, used for anamorphic compression, are shown behind the lenses 406 and 405 and are indicated as parts 404 and 403. Such prisms are one of two refractive means for producing anamorphic images, the other being cylindrical lenses as have been described above.

The upper and lower wedge prisms, which are in front of the image forming lenses 406 and 405, are used in combination with their corresponding objectives; namely the parts associated with the left lens 406 are 410 and 408, and the parts associated with the right lens 405 are parts 409 and 407. Each set of prisms generally diverts the light path horizontally in equal and opposite directions to increase the effective distance of t. The aforementioned combinations of prisms have this specification: 410 and 408 are made of glasses that have different indices of refraction and dispersion so that the light which traverses the prisms on its way to the objective lens 406 and anamorphic prism elements 404 is well corrected for chromatic aberration. Similarly, elements 409 and 411 are made of glasses that have different indices of refraction and dispersion so that the light which traverses the prisms on its way to the objective lens 405 and anamorphic prism elements 403 is also well corrected for chromatic aberration.

The upper prism section, made of parts 408, 410, and 409, 407, may be mechanically interchangeable with other sets of prisms to allow for different values of t. This ability to change t can be particularly beneficial for 3D theatrical motion picture cinematography.

The function of wedge prism combinations 410, 408 and 409, 410 as shown has not been described as a means to provide anamorphic compression. The purpose described is to bend the light rays in equal and opposite directions to increase the value of t. The two-times squeeze is the job of the wedge prism sets shown as parts 404 and 403, and as noted above cylindrical elements may be used in place of prism elements. It is also possible to design parts 410 combined with 408 and 409 combined with 407 to provide 2:1 anamorphosis without the use of the rear components 404 and 403. Anamorphosis can be achieved in two steps with the forward sets of prisms combined with the rear sets of internal prism elements 404 and 403, provided the forward and rearward sets of prisms have the right power, for a total compression of 2:1.

Figure 5:
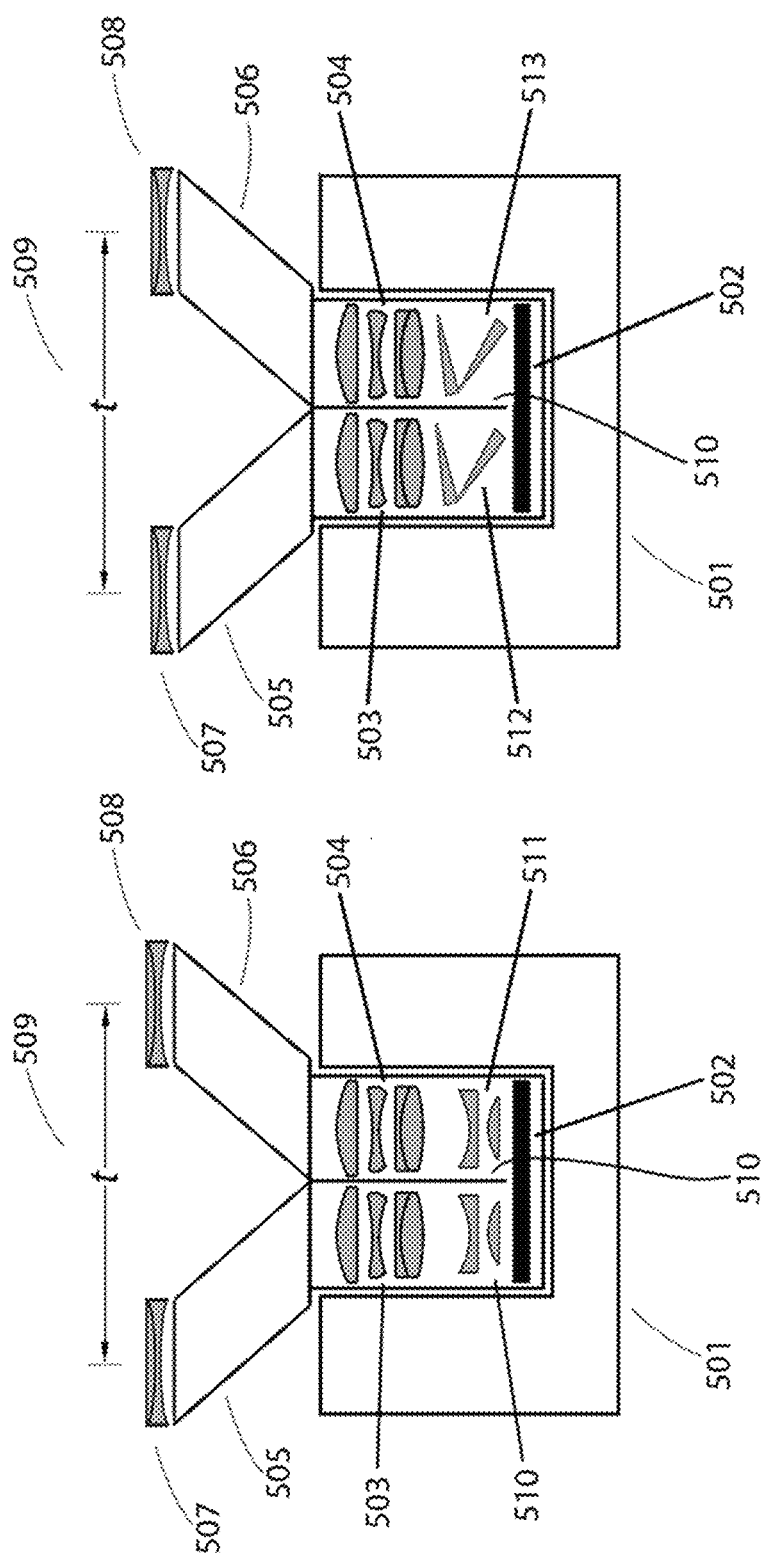
FIG. 5A is a schematic drawing of an embodiment of the subject technology using a prism system with negative front element lenses and dual photographic objectives with cylindrical anamorphic elements.
FIG. 5B is a schematic drawing of an embodiment of the subject technology using a prism system with negative front element lenses and dual photographic objectives with prismatic anamorphic elements.

Cylindrical anamorphic elements or wedge prisms may be used for image compression; either will function in the context of the disclosed designs. This point is illustrated with the help of FIGS. 5A and 5B which show new optical configuration for achieving anamorphically squeezed side-by-side stereo-pairs. FIGS. 5A and 5B have many components in common: The camera body is delineated by 501, the image sensor by 502, the photographic objectives by 503 and 504, and rhombic prisms 505 and 506 are shown that are similar in function to those used in FIG. 3B. Negative power corrected elements are shown in front of the rhombic prisms as parts 507 and 508, both of which consist of two elements. These parts, for FIGS. 5A and 5B, are of identical design, consisting of plano-convex and plano-concave elements whose net diopter power is negative. Other combinations of elements that provide the net negative power and image correction may also be used. These elements, plano-convex and plano-concave respectively, are made up of glasses of different indices of refraction and different dispersion for aberration correction.

As described with the help of FIG. 3B, the rhombic prisms 505 and 506 are used for bending the optical path of image forming light thereby increasing t, so it will be suitable for photography involving different camera-to-subject distances. Moreover, the image forming lens ensemble, objectives 503 and 504, and their associated anamorphosing components, may remain in place and different sets of rhombic prisms may be attached for different values of t. Parts 510 and 511 of FIG. 5A use cylindrical lens elements whereas in FIG. 5B wedge prism sets 512 and 513 are used. Showing two versions of similar designs is intended to reinforce the point that either cylindrical lenses or prisms may be used for anamorphosis.

Cinematography depends on using lenses with different angles of view to provide various perspective effects and to control depth of field. In particular, wide angle lenses are especially useful for 3D photography. The designs shown in FIGS. 5A and 5B can employ a wide range of focal lengths and are not dependent upon using a longer focal length, as is the case for the embodiments shown in FIGS. 3A and 3B, which use lens-splitting reflection optics. However, as was taught by the previously cited Condon and Hoch, it is important to restrict the angle of view of prime objectives 503 and 504 to keep the restrict prism elements 505 and 506 to a reasonable size. Negative diopter components 507 and 508 increase the lens angle of view, a function similar to that performed by the well-known afocal converter.

Septum 510, shown as a vertical black line, is used to separate the images formed by adjacent lenses 503 and 504. Septum 510 is made of a thin light absorbing material which, while preventing crosstalk between the perspective views, must also prevent reflections within each lens.

Figure 6:
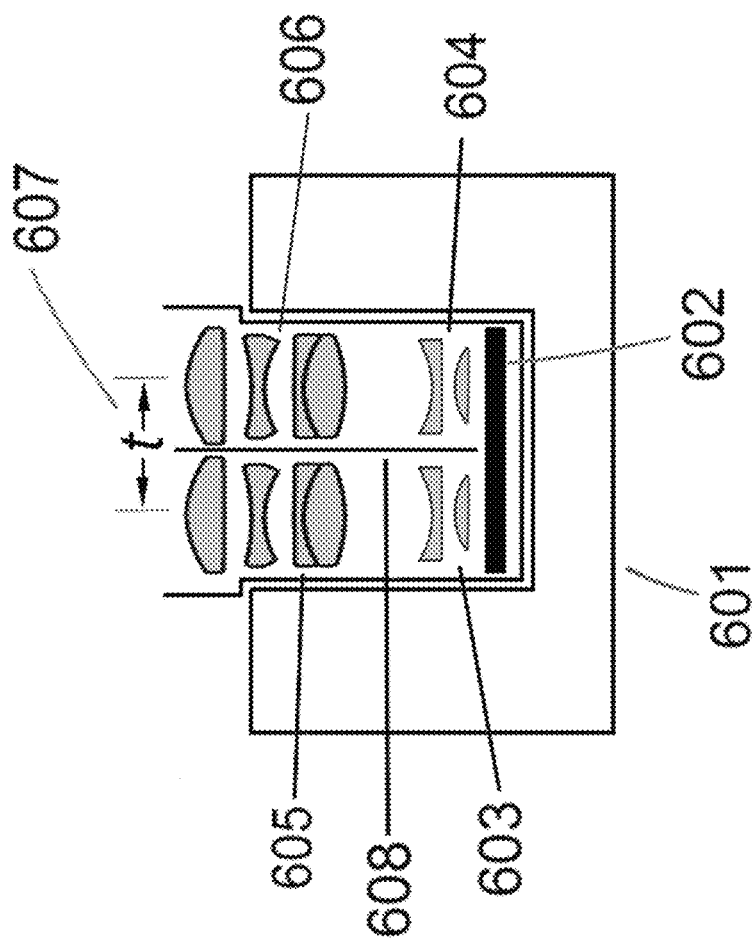
FIG. 6 is a schematic drawing of an embodiment of the subject technology using dual photographic objectives for close-up cinematography.

Close-ups require a small t. One embodiment capable of such a specification is shown in FIG. 6, which is similar to the embodiment shown FIGS. 5A and 5B but without the rhomboid prism and negative power diopter lens elements. The camera 601 has sensor 602, the anamorphic cylindrical lens components are 603 and 604 and the interaxial separation t, is labeled 607, but is now determined simply by the optical center of the prime lenses 605 and 606. t in this case is approximately half the value of the width of the digital sensor 602, which for the Super 35 format is 12 mm. Wide-angle lenses also benefit from the use of a reduced interaxial separation because they can increase the perspective cue, when properly used, which stresses the stereopsis cue. Without such a reduction in the interaxial separation, such images may elongate the images when they are projected.

The present design, to a large extent, preserves both the usual methodologies for cinematography and for post-production workflow. By making the dual-lens stereoscopic optics described here compatible with existing methods for manufacturing theatrical motion pictures, not only will products based on these teaching have greater acceptance, but they will materially aid in the ability of creative people in the film industry to produce better looking motion pictures at a lower cost than that possible using existing 3D rigs or by use of the conversion process based on two-dimensional images.

Figure 7:
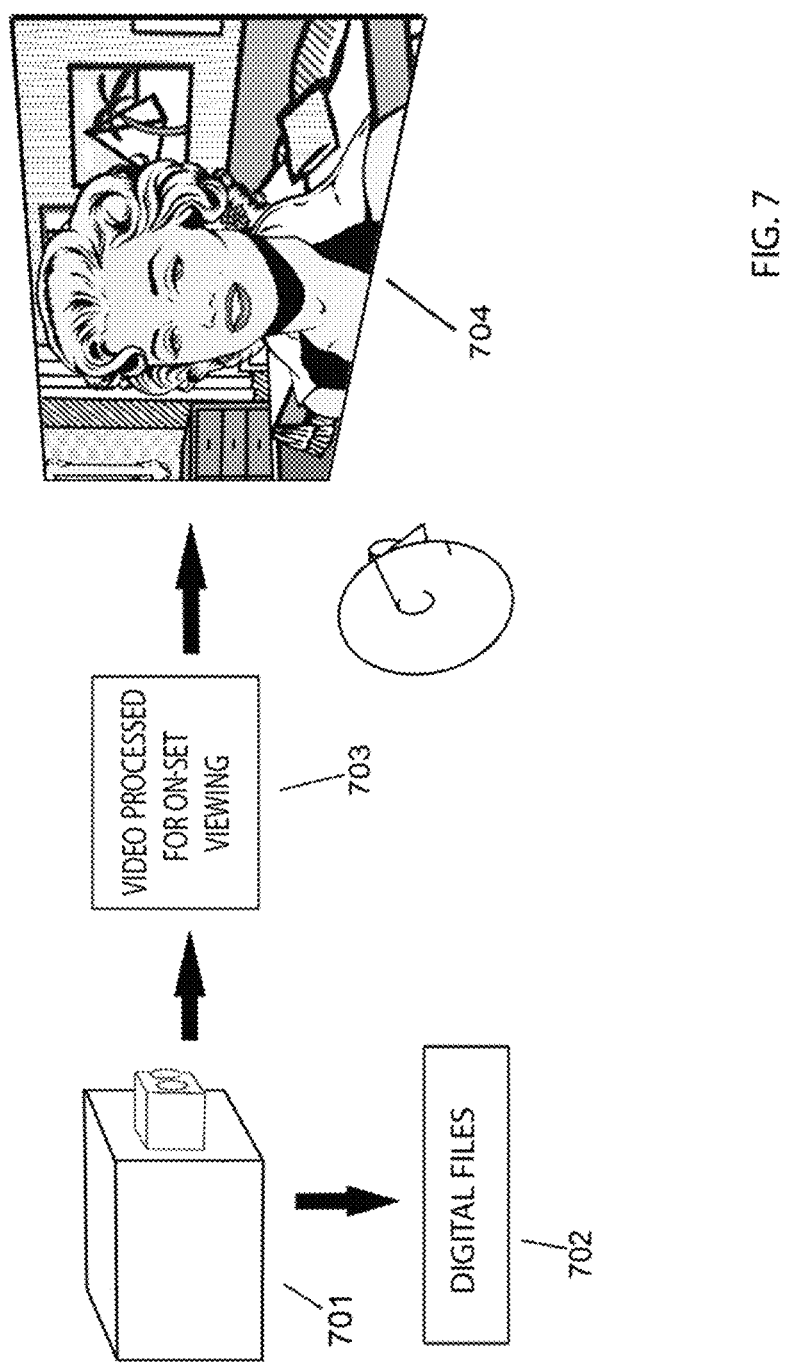
FIG. 7 is a schematic drawing of the on-set workflow required by the side-by-side anamorphic format.

That the present design adapts well to the current methodology of cinematography as shown with the help of FIG. 7. The video signal from camera 701 is processed for on-set viewing by means of video processing unit 703. Digital cinema cameras output signals for both real-time viewing and for the recording of digital files of high quality for post-production, shown as files 702. Stereoscopic monitor 704 has a 3D image to be viewed by the technical and creative team at the time of cinematography. It is crucial for the creative and technical people to be able to see the results of what they are doing and this can be accomplished by using any one of a number of off-the-shelf stereoscopic monitors, many of which are available as flat-panel consumer TV sets.

Video processing occurs at point 703. With reference to FIG. 2 it can be seen how the side-by-side image 201 created by the camera optics disclosed here is transformed into stereo pairs at point 202 (which corresponds to the video processor 703). Left and right perspective images 203 and 204 are so produced and require further processing which may occur at 703 and/or the monitor. Two types of 3D video monitors currently exist; first, those that use the field-sequential approach that produces a stream a stream of alternating left and right images. Consumer stereoscopic sets often have the capability of taking the side-by-side images and turning them into a field-sequential image to be viewed through shuttering eyewear.

Therefore the amount of video processing for such monitors may be minimal, but the outputted video should be rectified and have corrected aberration. If there are geometric distortions introduced by the optics, removal of such distortions is highly beneficial and may be performed using state-of-the-art imaging techniques. Moreover, rectifying the left and right images may be beneficial and also symmetrical in terms of geometry and illumination.

A second type of monitor or TV often employed uses passive polarizing eyewear. Such monitors use micro-polarizing technology that alternates rows of left and right-handed polarizing strips. The image on the screen is inter-digitated to produce alternate left and right video lines, a kind of interlace. Such monitors or TVs are also able to accept side-by-side data and electronically interdigitate the data.

The optics of the present design have parallel optical axes to eliminate asymmetrical trapezoidal distortion, which is endemic to the toe-in method often used for cinematography when rigs are employed (See Lipton's *Foundations of the Stereoscopic Cinema*, Van Nostrand Reinhold Company, New York, 1982, which is incorporated herein by reference). Thus the zero parallax setting (ZPS) is accomplished by the preferable technique of horizontally laterally shifting of the left and right images in equal and opposite directions, a process called HIT (horizontal image translation, as described in Lipton's *The CrystalEyes Handbook*, Stereo-Graphics Corp, 1991, ISBN: 9629566-0-0, which is incorporated herein by reference). This relatively minor image transformation is achieved with the help of electronics processor 703 which can also feed HIT metadata to the digital files 703 for use in postproduction.

Figure 8:
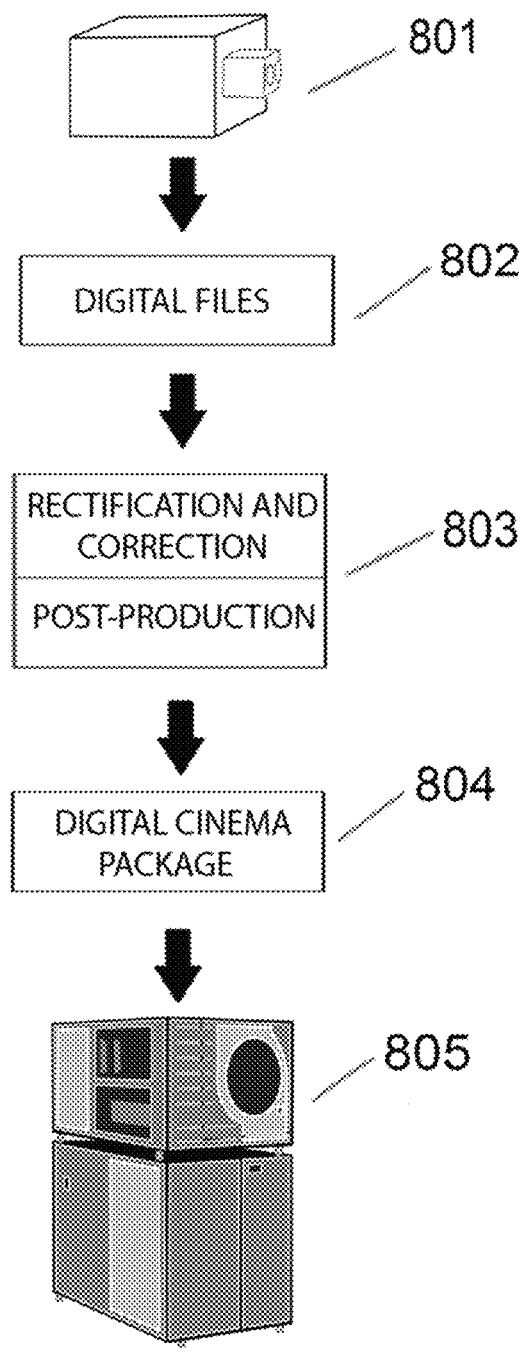
FIG. 8 is a schematic drawing of the post-production workflow required by the side-by-side anamorphic format.

Motion pictures in general and stereoscopic motion pictures in particular are manufactured products. An important part of the manufacturing process occurs in post-production. FIG. 8 illustrates the post-production process that is to be used for the digital files of movies that have been photographed using the subject side-by-side anamorphic optics. A digital camera using a lens design according to the current design is shown at point 801. Digital files 802 (corresponding to files 702 of FIG. 7), output by the camera, have been stored or recorded on digital media. The postproduction rectification and correction steps are shown at point 803, while a departure from the traditional workflow, have become routine steps in the post-production process for 3D movies.

One difference for the digital files produced with the subject lenses is that these are single files containing left and right side-by-side anamorphically compressed images rather than separate left and right files recorded from the left and right cameras that are recorded from a dual camera rig. In addition, metadata characterizing the aberration of the left and right images and information characterizing departures from binocular symmetry of the two images with respect to each other may also be recorded as metadata so that improvement to the images may be made at this step. Alternately, software may be employed to correct and rectify the images.

The purpose of post-production is to produce a completed edited film, with proper color and stereo timing and all steps required to finally prepare a digital cinema package 804 (DCP) for distribution to theaters to be played back on their servers and fed to a suitable digital projector 805. Although a theatrical digital projector is illustrated in the flow chart, stereoscopic motion pictures manufactured according the precepts of the subject technology may also be viewed on television sets, handheld devices, or the like, using various means of distribution.

These teachings concentrate on optics but take advantage of the fact that there are off-the-shelf post-production correction and rectification tools that are noted above and explanations of such are accordingly beyond the scope of this disclosure. Workers in the field will also understand that certain optical instrumentation details, such as focus and aperture controls, which are well traveled art, have many readily available mechanical solutions and for this reason have not been discussed. For practical reasons, such as the width of the lenses' septums, horizontal compression and decompression may depart somewhat from a value of two.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
 a lens body configured to fit within a standard digital cinema camera, the lens body comprising:
  a dual parallel channel anamorphic horizontal multiple times optical squeezing lens arrangement comprising two optically identical parallel axially aligned arrangements of elements comprising a first plurality of lenses and prisms aligned along a first axis and a second plurality of lenses and prisms aligned along a second axis; and
  a sensor; and
 off-axis optical components comprising prism components configured to receive two received images separated by an interaxial separation distance, the off-axis components configured to provide the two received images to the first plurality of lenses and prisms and the second plurality of lenses and prisms such that a first received image is provided to the first plurality of lenses and prisms along the first axis and a second received image is provided to the second plurality of lenses and prisms along the second axis, wherein the first axis is separated from the second axis by a separation distance less than the interaxial separation distance;
 wherein the prisms of the first plurality of lenses and prisms comprise at least one forward prism away from the sensor and a plurality of rear prisms proximate the sensor, the prisms of the second plurality of lenses and prisms comprise at least one forward prism away from the sensor and a plurality of rear prisms proximate the sensor, and at least one received image passes through every prism in the apparatus.

2. An apparatus comprising:
 a lens body comprising:
  dual parallel channel anamorphic multiple times horizontally optically compressing means for compressing two received images, said means comprising a first plurality of lenses and prisms aligned along a first axis and a second plurality of lenses and prisms aligned along a second axis; and
  a sensor; and
 off-axis optical components comprising prisms configured to receive the two received images separated by an interaxial separation distance, the off-axis components free of reflective surfaces and configured to provide the two received images to the first plurality of lenses and prisms and the second plurality of lenses and prisms such that a first received image is provided to the first plurality of lenses and prisms along the first axis and a second received image is provided to the second plurality of lenses and prisms along the second axis, wherein the first axis is separated from the second axis by a separation distance less than the interaxial separation distance;
 wherein the prisms of the first plurality of lenses and prisms comprise at least one forward prism away from the sensor and a plurality of rear prisms proximate the sensor, the prisms of the second plurality of lenses and prisms comprise at least one forward prism away from the sensor and a plurality of rear prisms proximate the sensor, and at least one received image passes through every prism in the apparatus.

3. The apparatus of claim 1, wherein the off-axis optical components comprise a plurality of wedge prisms.

4. The apparatus of claim 3, wherein a first wedge prism has a first index of refraction and the first plurality of lenses and prisms comprises a second wedge prism having a second index of refraction.

5. The apparatus of claim 3, wherein the dual parallel channel anamorphic horizontal multiple times optical squeezing lens arrangement further comprises at least one spherical lens.

6. The apparatus of claim 4, wherein no lenses and no prisms are provided between the first wedge prism and the second wedge prism.

7. The apparatus of claim 6, wherein the off-axis optical components comprise a first complementary wedge prism having the first index of refraction and the second plurality of lenses and prisms comprises a second complementary wedge prism having the second index of refraction.

8. The apparatus of claim 2, wherein the off-axis components comprise a plurality of wedge prisms.

9. The apparatus of claim 8, wherein a first wedge prism has a first index of refraction and the first plurality of lenses and prisms comprises a second wedge prism having a second index of refraction.

10. The apparatus of claim 8, wherein the dual parallel channel anamorphic multiple times horizontally optically compressing means further comprises at least one spherical lens.

11. The apparatus of claim 9, wherein no lenses and no prisms are provided between the first wedge prism and the second wedge prism.

12. The apparatus of claim 11, wherein the off-axis optical components comprise a first complementary wedge prism having the first index of refraction and the second plurality of lenses and prisms comprises a second complementary wedge prism having the second index of refraction.

13. An apparatus comprising:
 a lens body comprising:
  dual parallel channel anamorphic horizontal multiple times optical squeezing lenses comprising two optically identical axially aligned parallel arrangements of elements comprising a first plurality of lenses and prisms aligned along a first axis and a second plurality of lenses and prisms aligned along a second axis; and
  a sensor; and
 off-axis optical components comprising prisms configured to receive two received images separated by an interaxial separation distance, the off-axis components free of reflective surfaces and configured to provide the two received images to the first plurality of lenses and prisms and the second plurality of lenses and prisms such that a first received image is provided to the first plurality of lenses and prisms along the first axis and a second received image is provided to the second plurality of lenses and prisms along the second axis, wherein the first axis is separated from the second axis by a separation distance less than the interaxial separation distance;
 wherein the first plurality of lenses comprises a first anamorphic lens arrangement positioned adjacent the sensor, the anamorphic lens arrangement comprising a wedge prism;
 wherein the prisms of the first plurality of lenses and prisms comprise at least one forward prism away from the sensor, the prisms of the second plurality of lenses and prisms comprise at least one forward prism away from the sensor, and at least one received image passes through every prism in the apparatus.

14. The apparatus of claim 13, wherein the off-axis optical components comprise a plurality of wedge prisms.

15. The apparatus of claim 14, wherein the dual parallel channel anamorphic horizontal multiple times optical squeezing lenses further comprise at least one spherical lens.

16. The apparatus of claim 14, wherein a first wedge prism has a first index of refraction and the first plurality of lenses and prisms comprises a second wedge prism having a second index of refraction.

17. The apparatus of claim 16, wherein no lenses and no prisms are provided between the first wedge prism and the second wedge prism.

18. The apparatus of claim 17, wherein the off-axis optical components comprise a first complementary wedge prism having the first index of refraction and the second plurality of lenses and prisms comprises a second complementary wedge prism having the second index of refraction.

* * * * *